(12) United States Patent
Morvant et al.

(10) Patent No.: US 8,651,426 B2
(45) Date of Patent: Feb. 18, 2014

(54) JET ENGINE INSTALLATION

(75) Inventors: Romuald Morvant, Tamworth (GB); Kevin M Britchford, Belper (GB)

(73) Assignee: Rolls-Royce PLC, London (GB)

( * ) Notice: Subject to any disclaimer, the term of this patent is extended or adjusted under 35 U.S.C. 154(b) by 153 days.

(21) Appl. No.: 13/170,702

(22) Filed: Jun. 28, 2011

(65) Prior Publication Data

US 2012/0001022 A1     Jan. 5, 2012

(30) Foreign Application Priority Data

Jul. 1, 2010 (GB) .................................. 1011056.7
Feb. 15, 2011 (GB) .................................. 1102597.0
Feb. 18, 2011 (GB) .................................. 1102809.9

(51) Int. Cl.
   *B64C 23/00* (2006.01)

(52) U.S. Cl.
   USPC .................... 244/199.1; 244/54; 244/199.3

(58) Field of Classification Search
   USPC ..................... 244/54, 199.1, 199.3
   See application file for complete search history.

(56) References Cited

U.S. PATENT DOCUMENTS

| | | | |
|---|---|---|---|
| 2,740,596 A | 4/1956 | Lee | |
| 4,238,092 A | 12/1980 | Brennan | |
| 5,088,665 A * | 2/1992 | Vijgen et al. | 244/200 |
| 6,179,249 B1 | 1/2001 | Canadas | |
| 6,378,804 B1 | 4/2002 | Cambon | |
| 2006/0169848 A1* | 8/2006 | Libby | 244/216 |
| 2007/0107414 A1 | 5/2007 | Papamoschou | |
| 2008/0067292 A1 | 3/2008 | Bonnaud et al. | |
| 2009/0261198 A1* | 10/2009 | Bonnaud et al. | 244/54 |
| 2010/0051744 A1 | 3/2010 | Bonnaud et al. | |

FOREIGN PATENT DOCUMENTS

| | | |
|---|---|---|
| FR | 2 898 336 A1 | 9/2007 |
| GB | 2 112 077 A | 7/1983 |
| GB | 2 208 502 A | 4/1989 |
| GB | 2 390 345 A | 1/2004 |

OTHER PUBLICATIONS

Search Report issued in British Application No. GB1011056.7 dated Oct. 19, 2010.
Search Report issued in British Application No. GB1102809.9 dated Jun. 16, 2011.
Search Report issued in British Application No. GB1102597.0 dated May 10, 2011.

* cited by examiner

*Primary Examiner* — Timothy D Collins
*Assistant Examiner* — Nicholas McFall
(74) *Attorney, Agent, or Firm* — Oliff PLC

(57) ABSTRACT

Noise generated by a gas turbine engine 6 supported by a pylon 8 on a wing 2 of an aircraft is reduced by influencing a shear layer generated between the free-stream flowfield and flow from the engine 6. The shear layer is influenced by means of one or more winglets 18, 20, 22 which interact with the free-stream flowfield to deflect the shear layer 14 downwardly, to avoid interaction with a flap 4 on the wing 2, or to reduce the strength of the shear layer 14.

19 Claims, 7 Drawing Sheets

JET ENGINE INSTALLATION

This invention relates to a jet engine installation on an aircraft.

Aircraft noise is a major problem in the aircraft industry. Aircraft manufacturers are under continual pressure to reduce the amount of noise produced by aircraft, particularly during takeoff and landing. Significant noise can be caused by aircraft gas turbine engines and other jet engines. In particular, the downstream mixing of flow exiting from bypass and core sections of a gas turbine engine can generate jet noise.

Further noise can be generated as a result of various installation effects, especially in engine installations in which a jet shear layer closely couples to wing and/or flap surfaces. The shear layer is generated from the interaction between the air leaving the engine, and in particular from the bypass duct of a turbofan engine, and the free-stream airflow, or flowfield, over the aircraft. The proximity of the shear layer to the wing and flap of the aircraft leads to acoustic pressure fluctuations that tend to propagate upstream of the wing and contribute to the noise of the aircraft as perceived on the ground. Although noise generation mechanisms are not presently fully understood, it is apparent that the radiated noise from the interaction between the engine outflow and the wing flap is highly correlated with the shear layer strength. The shear layer strength is correlated with the velocity difference between the engine outflow and the free-stream airflow.

US 2007/0107414 (the disclosure of which is incorporated herein by reference) discloses a jet engine installation in which noise reduction is attempted by directing secondary airflow from a fan of the engine sideways and downwards with respect to the primary flow from the engine core.

According to one aspect of the present invention there is provided a jet engine installation on an aircraft, comprising a jet engine supported beneath a wing of the aircraft by a pylon, a flow deflector being disposed above the engine to influence a shear layer generated between flow from the engine and the surrounding free-stream flowfield, the flow deflector being adjustable about an axis which extends transversely of the pylon.

The engine may be a gas turbine engine such as a turbofan engine, in which case the flow deflector may be disposed to influence the shear layer generated between the bypass flow and the free-stream flowfield.

The flow deflector may be an aerofoil, and may be in the form of a winglet. The winglet may be mounted on the pylon, and may extend from the pylon substantially in the spanwise direction of the wing. The flow deflector may be positioned so as to be above the shear layer during normal flight of the aircraft, so that the flow deflector does not act directly on the shear layer.

According to another aspect of the present invention, there is provided a method of reducing noise during flight from an aircraft engine supported by a pylon beneath a wing of the aircraft, the method comprising deploying a flow deflector to deflect free-stream flowfield between the engine and the wing thereby to influence a shear layer generated between the free-stream flow and flow from the engine, the flow deflector being situated above the engine and being deployed by rotating the flow deflector about an axis extending transversely of the pylon.

In the context of this specification, the expressions such as "above" and "below" relate to the orientation of the aircraft in normal level flight.

For a better understanding of the present invention, and to show more clearly how it may be carried into effect, reference will now be made, by way of example, to the accompanying drawings, in which:

FIG. 1 shows an aircraft wing supporting a turbofan engine, and schematically represents shear layers generated by the engine;

FIG. 2 corresponds to FIG. 1 and shows flow deflectors situated between the engine and the wing;

FIG. 3 schematically indicates the mounting arrangement of a flow deflector;

Figure 1:
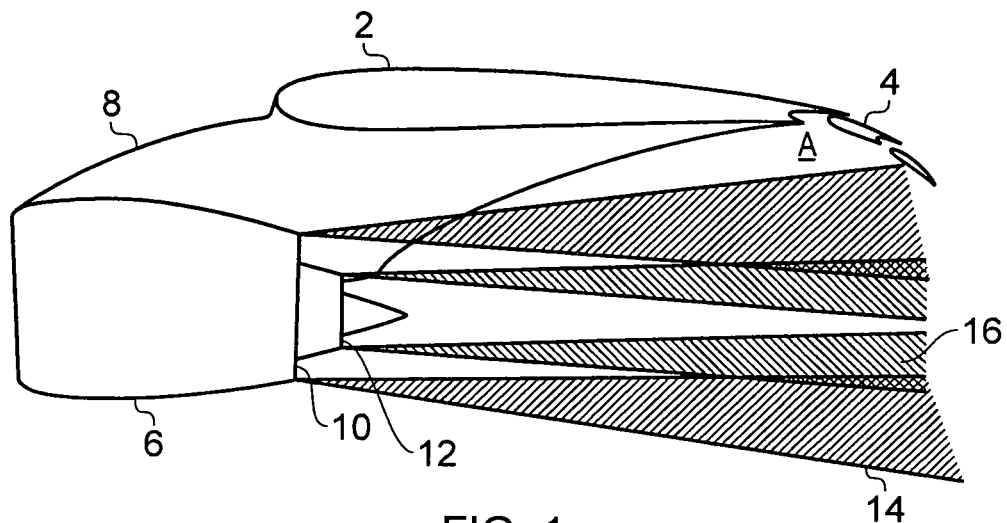

FIG. 1 shows an aircraft wing 2 provided with a flap 4 comprising two flap sections. A turbofan gas turbine engine 6 is supported on the wing 2 by a pylon 8.

The engine 6 has a bypass nozzle 10 and a core nozzle 12. In operation, a high speed core engine flow issues from the core nozzle 12, and a slower bypass flow issues from the bypass nozzle 10. The bypass flow interacts with the free-stream flowfield surrounding the aircraft to form a first annular shear layer 14, while the core flow and the bypass flow interact to form a second shear layer 16. The shear layers grow in the direction away from the engine 6, and interact with one another producing increased mixing before decaying further downstream.

FIG. 1 shows the general paths of the shear layers 14, 16 if they are unimpeded. It will be appreciated that, at least when the flap 4 is extended to a large flap angle as indicated in FIG. 1, the first shear layer 14 will be in close proximity to the flap 4. The interaction between the shear layer 14 and the flap 4 is a source of noise, and this is particularly undesirable when the aircraft is flying close to the ground, as during takeoff and landing.

The level of noise is correlated with the strength of the shear layer, and this depends on the relative velocities of the bypass flow and the free-stream flow. The flow patterns beneath the wing 2 and over the pylon 8 depend on the pylon geometry and the flight Mach number. When flying at high angles of attack (i.e. with the aircraft nose up) and with a large angle of the flap 4, the flow underneath the wing slows down in the region A in FIG. 1, so increasing the strength of the shear layer 14, i.e. the level of turbulence occurring in the shear layer. The interaction of a stronger shear layer 14 with the flap 4 can cause increased noise level.

Figure 2:
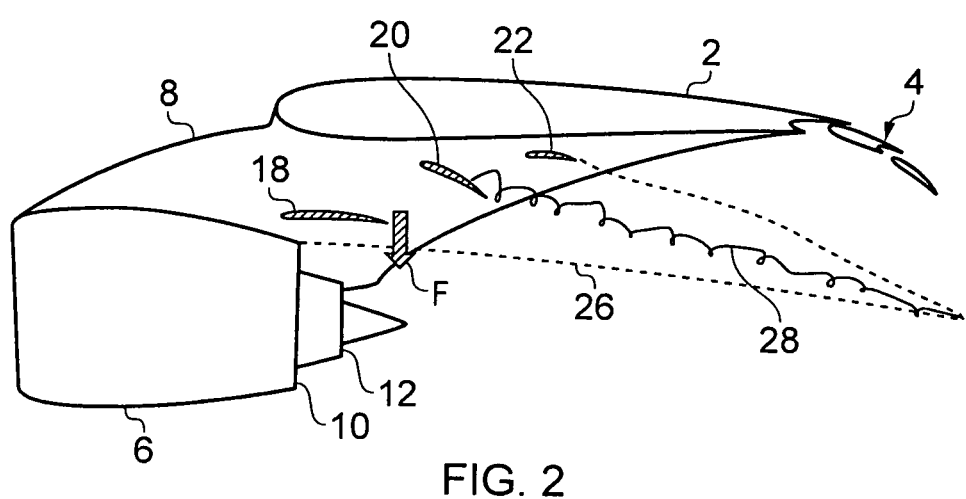

FIG. 2 shows the wing-mounted engine of FIG. 1, with the addition of three flow deflectors 18, 20 and 22. Although three deflectors 18, 20 and 22 are shown in FIG. 2, they perform different functions, and all three flow deflectors may not be necessary in all circumstances. Consequently, any one, or any two, of the flow deflectors 18, 20, 22 may be provided. All of the flow deflectors 18, 20, 22 are situated above the bypass nozzle 10 and above the first shear layer 14.

All of the flow deflectors 18, 20 and 22 in the embodiment shown in FIG. 2 comprise aerofoils, and may be in the form of winglets mounted on the pylon 8. The winglets 18, 20, 22 project from one or both sides of the pylon 8, and may have a spanwise length which is not greater than half of the overall diameter of the bypass nozzle 10.

Figure 3:
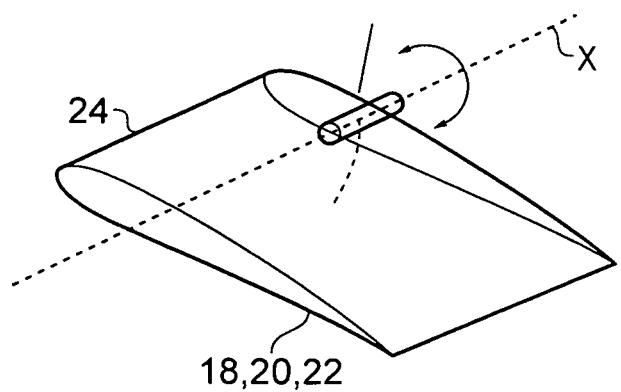

Each winglet 18, 20, 22 is mounted on the pylon 8 so as to be adjustable about an axis X (as shown in FIG. 3) which extends transversely of, and possibly perpendicular to, the pylon 8. In this embodiment the axis X is substantially parallel to the leading edge of the winglet 18, 20, 22. Thus, the winglets 18, 20, 22 are oriented so that their leading edges 24 are directed into the free-stream airflow, although their angle of attack with respect to that airflow is adjustable about the respective axis X.

The flow deflector 18 is situated immediately aft of the bypass nozzle 10 of the engine 6, and just above it. The flow deflector 18 is thus situated above the first shear layer 14 generated between the bypass air and the free-stream flow.

When deployed for noise reduction, the winglet 18 is positioned about its axis X so as to exert a lift force on the pylon 8, which has the effect of creating a downwash force F on the free-stream airflow. This downwash force F deflects the first shear layer 14 downwardly, so that its upper limit, indicated schematically by a dotted line 26, lies below the flap 4. As a result, there is a reduced interaction between the first shear layer 14 and the flap 4 or other parts of the wing 2, and any noise generated by this interaction is reduced.

The winglet 18 may be deployed for noise reduction when the aircraft is at low altitude, and in particular when the flap 4 is extended at a high flap angle, such as during takeoff or landing. During normal flight at cruising altitudes, the winglet 18 is rotated about its axis X to assume an aerodynamically efficient orientation to minimise drag.

The winglet 20 is illustrated in FIG. 2 as being above and aft of the winglet 18. However, the winglet 20, if provided together with the winglet 18, performs a function which is independent of that of the winglet 18, and consequently it may be positioned differently from the position shown in FIG. 2.

When deployed for noise reduction, for example during approach conditions, the winglet 20 is rotated about its axis X so as to function as a vortex generator and generate a turbulent wake 28 which promotes mixing in the upper region of the first shear layer 14, so weakening it and increasing its thickness. By reducing the strength of the shear layer 14, any noise generated by interaction between the shear layer 14 and the flap 4 is reduced.

As with the winglet 18, the winglet 20 is rotated about the axis X to an aerodynamically efficient orientation when noise reduction is not required.

The winglet 22 is shown positioned closer to the wing 2 than either the winglet 18 or the winglet 20. Again, however, the position may be varied to provide optimal noise reduction. The winglet 22, when deployed for noise reduction, is oriented about its axis X, so as to accelerate the flow over the pylon 8. Thus, the wing let 22 functions to reduce the deceleration of the free-stream airflow in the region A (FIG. 1). With appropriate design and positioning of the winglet 22, the free-stream flow can be accelerated, the resulting effect being to reduce the velocity differential between the first shear layer 14 and the free-stream airflow, so decreasing the strength of the shear layer 14. Consequently, even if the shear layer 14 interacts with the flap 4, its reduced strength will reduce the level of any noise generated.

As with the winglets 18 and 20, the orientation of the winglet 22 can be adjusted around the axis X during normal level flight conditions in order to reduce drag and improve aerodynamic performance.

One or more of the winglets 18, 20, 22 may be provided on the pylon 8 to function as described above. The or each winglet thus improves the aerodynamics of the flow around the nacelle of the engine 6 and the wing 2. The or each winglet controls the aerodynamics of the flow over the pylon 8 principally through the generation of a localised lift force or a vortex or other turbulent flow. The or each winglet 18, 20, 22 thus improves integration between the gas turbine engine 6, the pylon 8 and the wing 2 with the flap 4. It will be appreciated that the positions shown for the winglets 18, 20 and 22 are representative of a variety of possible positions. Optimal winglet positions will depend on the configuration of the engine 6, the pylon 8 and the wing 2, but can be established so as to control flow upstream or downstream of the leading edge of the wing 2.

Although the winglet 22 has been described as accelerating the free-stream airflow, in order to reduce the strength of the first shear layer 14, it is also possible in some circumstances for a winglet such as the winglet 22 to be deployed to decelerate the free-stream airflow so as to increase the strength of the shear layer 14, since this may be useful in exerting control on jet mixing.

In a modification of the winglets 18, 20, 22 described above, the winglets may be provided with passages so that air can be blown from their trailing edges to reduce drag.

Figure 4:
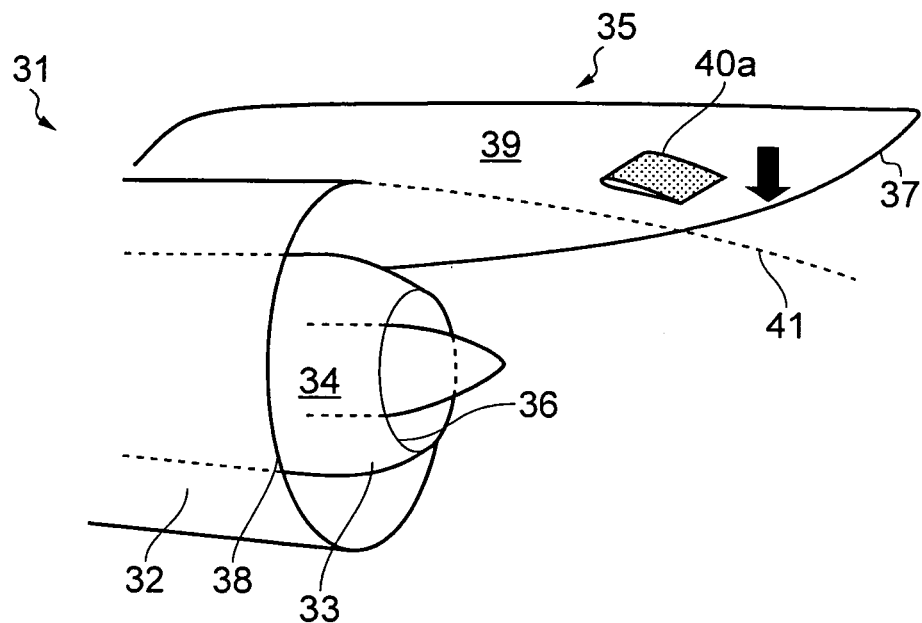
FIG. 4 shows schematically a pylon/winglet configuration for a gas turbine engine.

FIG. 4 shows schematically a further embodiment of a jet engine installation in accordance with the invention. A gas turbine engine 31 is attached, by a pylon 35, to a wing (not shown) of an aircraft. The engine has an annular bypass duct 34 defined between a fan nacelle 32 and a core fairing 33 for a flow of bypass air which exits the bypass duct at the trailing edge 38 of the fan nacelle. Exhaust gas from the core generator of the engine exits the engine exhaust nozzle formed by the trailing edge 36 of the core fairing. The pylon has two laterally-spaced side faces 39 which span the fan nacelle and the core fairing and extend in the rearward direction of the engine beyond the trailing edge of the core fairing to end at a trailing edge 37 which is aligned with the radial direction of the engine.

A flow deflector, in the form of a winglet 40a, extends from a side face 39 of the pylon. The winglet helps to push the flow downwards, as indicated by the block arrow and the dashed line 41. In this way, the winglet plays the aerodynamic role of part of the pylon, and the distance of the underside of the pylon from the exhaust flow can be increased, reducing the thermal stress on the pylon. In this embodiment and in the subsequent drawings, only one winglet 40a is provided on each side face 39; however, it will be understood that in other embodiments of the invention more than one winglet may be provided, as shown for example in the embodiment of FIG. 2.

Figure 5:
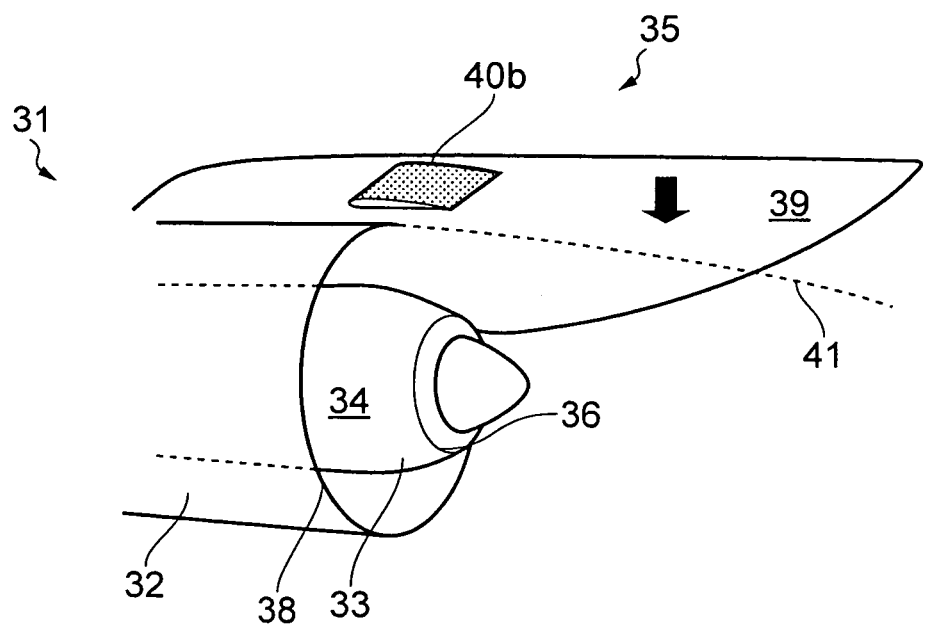
FIG. 5 shows schematically another pylon/winglet configuration for a gas turbine engine.

In FIG. 4, the winglet is located rearward of the trailing edges 36, 38 of both the core fairing and the fan nacelle. However, other locations are possible, for example as illustrated in FIG. 5, which shows schematically another gas turbine engine 31 in which a pylon 35 attaches the engine to a wing (not shown) of an aircraft. In FIG. 5, a winglet 40b is located directly above the trailing edge 38 of the fan nacelle. Typically, the winglet will be positioned above the jet shear layer formed between the bypass flow and the surrounding flow to avoid any direct impingement of the shear layer on the winglet.

In each of FIGS. 4 and 5, only one winglet 40 is shown, but it might be more usual to have a pair of winglets so that one is on each side of the pylon 35. Thus the introduction of one or more winglets on the external surface of the pylon allows various advantageous effects to be achieved.

Firstly, it is possible to decrease the weight of the pylon. That is, the weight penalty associated with the introduction of the winglets may be compensated by a reduction of the pylon size. For example, the winglets can take over from the pylon a task of pushing the surrounding flow downwards, allowing the underside of the pylon to extend less far into the bypass flow, as shown schematically in the winglet 40c and pylon 39 cross-section of FIG. 6(a), the original pylon cross-section (i.e. without winglets) being shown in dashed outline. An associated advantage is that the underside of the pylon is also then exposed to lower temperatures than would otherwise be the case.

Secondly, the winglets can deflect the bypass flowfield along the pylon, cooling those parts of the pylon exposed to high temperatures due to the presence of the core flow. The winglets can thus help to reduce thermal stresses on the pylon.

Figure 6:
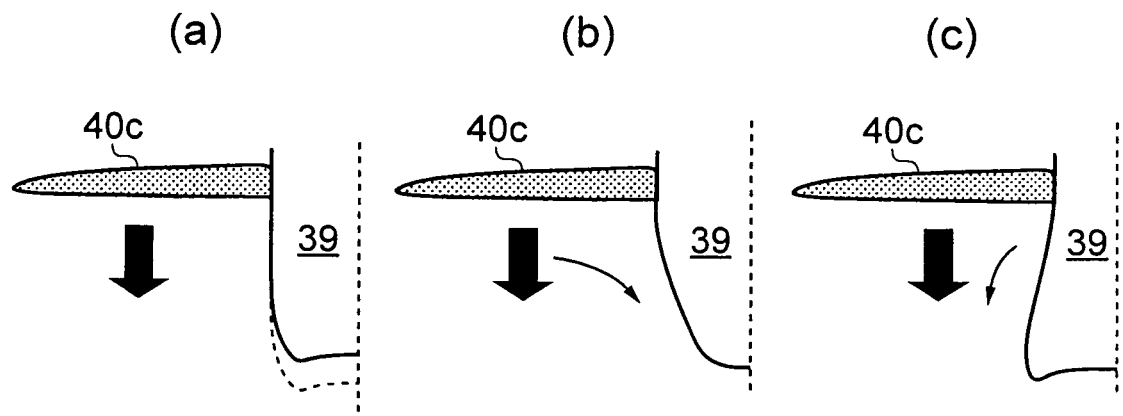
FIG. 6 shows schematically respective cross-sections (a) to (c) through possible winglet and pylon configurations.

Thirdly, the use of a modified pylon shape in combination with winglets allows an enhancement or degradation of the winglet's lift-induced force on the flowfield. This can enhance or reduce the mixing between the bypass or core flows, leading to noise reduction. For example, FIG. 6 shows cross-sections (a) to (c) through possible winglet 40c and pylon 39 configurations. In cross-section (a) the side face from which the winglet extends is substantially vertical beneath the winglet, while in cross-sections (b) and (c) the side face beneath the winglet respectively slopes away from and slopes towards the winglet. In cross-section (b) the downwards flow induced by the winglet is deflected towards the pylon centreline, while in cross-section (c) the downwards flow is deflected away from the pylon centreline.

Figure 7:
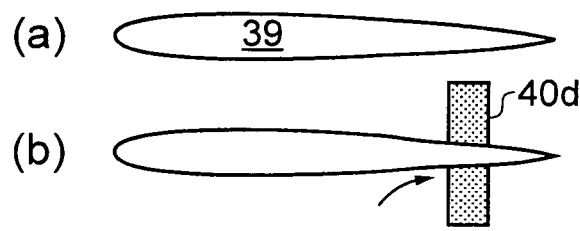
FIG. 7 shows schematically respective longitudinal section profiles for (a) an upper part of a pylon above a pair of winglets, and (b) the pylon at the level of the winglets.
Figure 8:
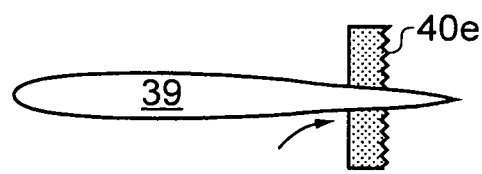
FIG. 8 shows schematically a longitudinal section profile for another pylon and a pair of winglets.

The pylon can also be designed so that the lift induced by the winglet strongly fluctuates at a given operating condition to trigger a high frequency mixing of the bypass and core flows and thereby reduce jet noise. The frequency of the fluctuation should typically be greater than the frequency defined by dividing the velocity of the jet by its diameter. For example, different longitudinal section profiles can be used from the upper to lower parts of the pylon to trigger the fluctuations, the curvature of the pylon shape determining whether the flow accelerates or decelerates. FIG. 7 shows schematically respective longitudinal section profiles for (a) an upper part of a pylon 39 above a pair of winglets 40d, and (b) the pylon at the level of the winglets. Undulations at the trailing-edge of the winglets 40e, as shown in FIG. 8, can enhance further the mixing of the flowfield by a variation of the wake strength and lift distribution of the winglet.

Figure 9:
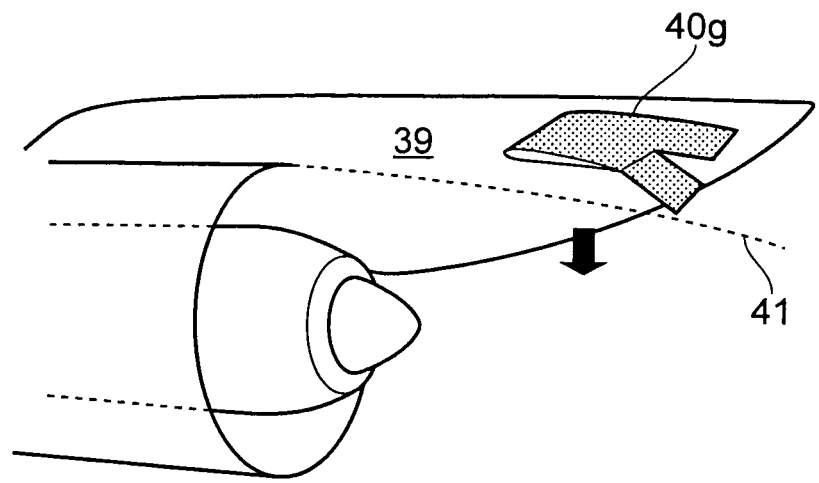
FIG. 9 shows schematically another pylon/winglet configuration for a gas turbine engine.

As explained above with reference to FIG. 3, the induced lift can be controlled by changing the angle of attack. Alternatively, only a part of the winglet 40g may be rotated, as illustrated in FIG. 9. The winglets' effects on the flow are controlled by their angle of attack with respect to the free-stream air direction. Different angles of attack will be required for different engine and aircraft operating conditions. Three ranges of winglet angle of attack are proposed, for approach conditions, high power and cruise.

Under approach conditions, for a winglet positioned just above the bypass nozzle (such as 18 in FIG. 3), the winglet angle of attack should be between 0 and 5 degrees to accelerate the flow around the pylon and below the wing flap and to accelerate the flow below the flap in order to reduce the shear layer strength. For a winglet positioned close to the wing flap (such as 22 in FIG. 3) the winglet angle of attack should be between 5 and 15 degrees to generate secondary flow below the wing flap and to accelerate the flow below the flap in order to reduce the shear layer strength.

Under high power conditions (for example, at take-off) the winglet angle of attack should be less than 5 degrees to ensure the deflection of the shear layer without increasing its strength.

Under cruise conditions, the winglet angle of attack should be between 0 and 2 degrees to straighten up the flow around the pylon and reduce drag.

Figure 10:
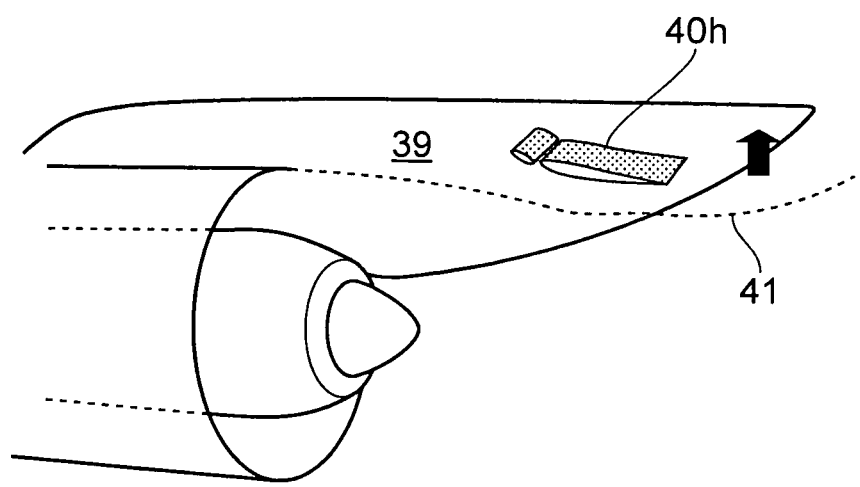
FIG. 10 shows schematically another pylon/winglet configuration for a gas turbine engine.

As illustrated in FIG. 10, the winglet 40h may be configured such that the force exerted by the winglet on the flow field can be used to re-direct a part of the flow in an upward direction towards the area below the flap to increase the flow velocity locally. A decreased difference in velocity between the bypass flow and the flow below the flap can reduce the strength of the shear layer between these flows, and subsequently the interaction of the shear layer with the flap trailing-edge, resulting in lower installation noise.

Figure 11:
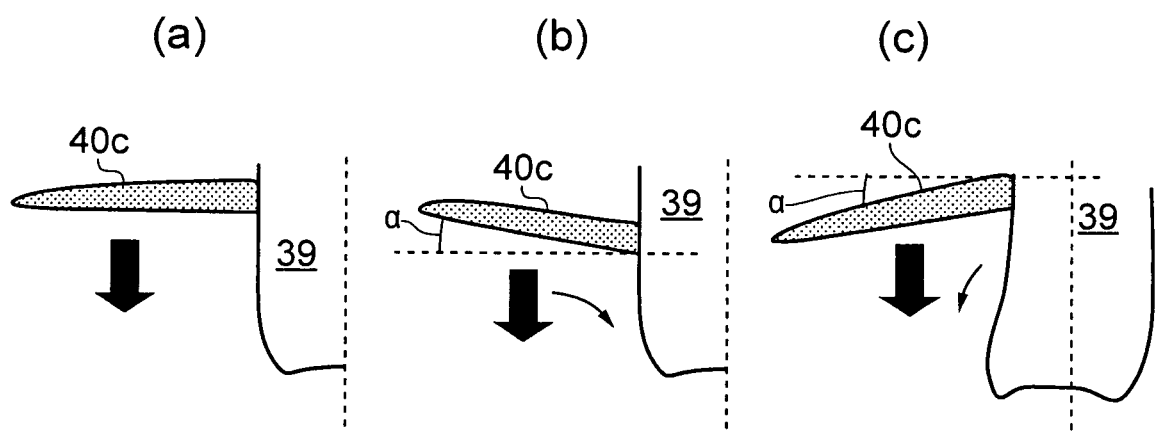
FIG. 11 shows schematically respective cross-sections (a) to (c) through possible winglet and pylon configurations.

FIG. 11 shows cross-sections (a) to (c) through possible winglet 40i and pylon 39 configurations. The winglet can extend outwardly in a direction either (a) perpendicular to the pylon centreline, (b) upwardly relative to the normal to the pylon centreline, or (c) downwardly relative to the normal to the pylon centreline. The angle $\alpha$ between the normal to the pylon centreline and the direction of outward extension of the winglet should typically not exceed 15°. In cross-section (b) the downwards flow induced by the winglet is deflected towards the pylon centreline (the deflection being enhanced by the sloping of the adjacent pylon side face away from the winglet), and in cross-section (c) the downwards flow induced by the winglet is deflected away from the pylon centreline (the deflection being enhanced by the sloping of the adjacent pylon side face towards the winglet).

Where the winglet is rotatable, as shown in FIG. 3, different systems may be used to rotate the winglet.

Figure 12:
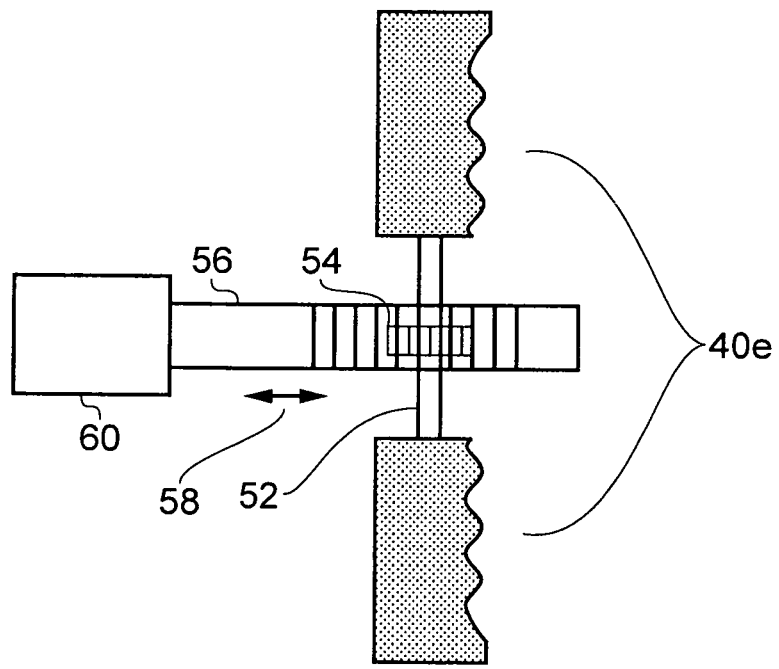
FIG. 12 shows schematically the winglets of FIG. 8 together with their rotation mechanism.

FIG. 12 shows the winglets of FIG. 8 together with their rotation mechanism. The winglets 40e are mounted on a drive shaft 52, which is coaxial with the axis of rotation X (shown in FIG. 3). Also mounted on the drive shaft 52 is a pinion 54. A toothed rack 56 engages with the pinion 54. The rack 56 can be moved back and forth (as shown by arrow 58) by an actuator 60, rotating the pinion 54 about its axis, which in turn rotates the drive shaft 52 and winglets 40e. The actuator 60 may be of any suitable type, depending on the operational requirements of the installation and the availability of a suitable power source. For example, a hydraulic actuator may be powered by hydraulic fluid extracted from the gas turbine engine, and regulated by suitable control valves. A pneumatic actuator may be powered by air extracted from the engine (for example, from a bleed valve on the IP compressor). Alternatively, an electro-mechanical actuator may be employed.

Figure 13:
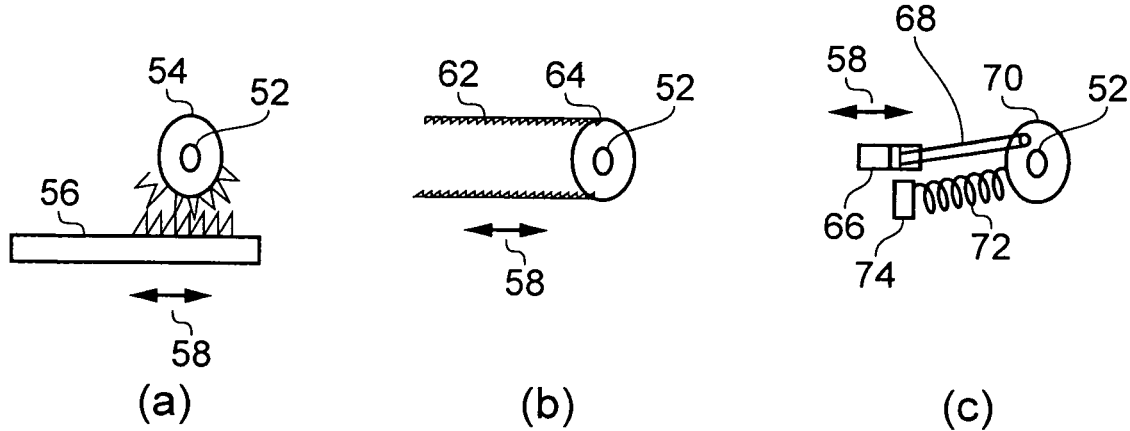
FIG. 13 shows alternative rotation mechanisms.

FIG. 13 shows alternative linkages to translate the linear motion of the actuator 60 of FIG. 12 into rotational motion of the drive shaft 52.

FIG. 13(a) shows the arrangement already described with regard to FIG. 12. The toothed rack 56 engages with the pinion 54, which is mounted on the drive shaft 52. The actuator causes movement of the rack in the direction of the arrow 58, causing rotation of the pinion 54 and drive shaft 52. The pinion 54 need not be toothed around its whole circumference, depending on the required angular range of movement of the drive shaft 52.

FIG. 13(b) shows an alternative linkage arrangement, in which a drive belt 62 engages with a pulley 64 mounted on the drive shaft 52. Movement of the belt 62 in the direction of the arrow 58 causes rotation of the pulley 64 and the drive shaft 52. The drive belt and pulley may be of any suitable type and may be toothed to prevent slippage and to ensure consistent angular positioning of the drive shaft 52 (and therefore the winglets 40e). The drive belt 62 may be driven by a linear actuator, as in FIG. 13(a), or it may be driven by a rotational actuator such as a stepper motor.

FIG. 13(c) shows a further alternative linkage arrangement. A link rod 68 is mounted at one end to a piston of a linear actuator 66, and at the other end near the periphery of a wheel 70 mounted on the drive shaft 52. The actuator may be, for example, a hydraulic or pneumatic actuator. The link rod 68 translates the linear movement of the piston, in the direction of the arrow 58, to rotational movement of the wheel 70 and therefore of the drive shaft 52. A spring 72, mounted at one end to structure 74 and at the other end to the wheel 70, provides a restoring force acting against the force applied by the piston. It will be appreciated that an alternative linkage, such as a crank, may be used in place of the wheel 70.

Figure 14:
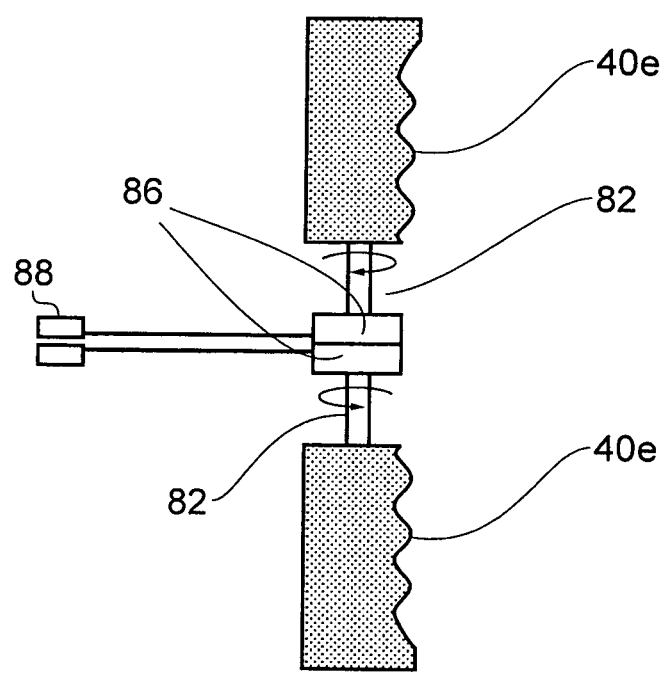
FIG. 14 shows an alternative arrangement of the winglets of FIG. 8.

FIG. 14 shows an alternative arrangement of the rotation mechanism. Each winglet 40e is mounted on a drive shaft 82. Each drive shaft 82 is directly rotated by a motor 86 attached to its other end. The motors may be electrical, hydraulic or pneumatic motors, and may be supplied with appropriate power from power supplies 88. It will be appreciated that this embodiment provides the flexibility to rotate the two winglets 40e through different angles, because they are controlled independently.

The use of a modified pylon shape in combination with winglets can also help to limit flow detachment around the pylon and to limit any low velocity flow re-circulation below the wing and/or flap. This can lead to a decrease in shear layer strength.

The pylon and winglet(s) may also be used to straighten the flow along the pylon at high angles of attack. A careful design of the winglet/pylon can help to accelerate the flow, thereby reducing any low velocity flow recirculation below the wing and/or flap at approach conditions, for instance, when significant installation noise associated with shear layer strength is likely to occur.

The various pylon/winglet configurations described above can be used to alter the characteristics of the shear layer and flow mixing. Different pylon configurations are proposed to achieve these effects. Not only can these configurations enable control of the flow mixing axially, during the development of jet noise sources, but they can also help to weaken the shear layer strength.

Overall, the pylon/winglet configurations can provide an improved aerodynamic integration between the gas turbine, the pylon and the wing. Some of the configurations can enhance the mixing between the bypass and core flows, and can redistribute of the flow around the pylon.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. A jet engine installation on an aircraft, comprising:
   a jet engine supported beneath a wing of an aircraft by a pylon; and
   a flow deflector being disposed on a lateral side of the pylon to influence a shear layer generated between flow from the engine and the surrounding free-stream flowfield, the flow deflector being adjustable about an axis which extends transversely of the pylon.

2. A jet engine installation as claimed in claim 1, in which the engine is a turbofan engine.

3. A jet engine installation as claimed in claim 2, in which the flow deflector is disposed to influence a shear layer generated between bypass flow from the engine and the free-stream flowfield.

4. A jet engine installation as claimed in claim 1, in which the flow deflector is mounted on the pylon.

5. A jet engine installation as claimed in claim 4, in which the flow deflector extends from the pylon substantially in the spanwise direction of the wing.

6. A jet engine installation as claimed in claim 1, in which the deflector is positioned above the fan nacelle.

7. A jet engine installation as claimed in claim 1, in which the deflector is positioned rearwardly of the trailing edge of the fan nacelle.

8. A jet engine installation as claimed in claim 1, in which the deflector is positioned rearwardly of the trailing edge of the core fairing.

9. A jet engine installation as claimed in claim 1, in which the trailing edge of the deflector is undulated.

10. A jet engine installation as claimed in claim 1, in which the deflector is rotatable.

11. A jet engine installation as claimed in claim 10, in which the deflector is rotatable to provide an angle of attack which can vary in the range from 0° to 15° relative to the angle of attack of the wing.

12. A jet engine installation as claimed in claim 1, in which the rotation of the deflector is achieved using a linear actuator.

13. A jet engine installation as claimed in claim 1, in which the flow deflector is positioned so as to be above the shear layer during normal flight of the aircraft.

14. A jet engine installation as claimed in claim 1, in which the deflector deflects the surrounding flow downwards.

15. A jet engine installation as claimed in claim 1, in which the deflector deflects the surrounding flow sideways.

16. A method of reducing noise during flight from an aircraft engine supported by a pylon beneath a wing of the aircraft, the method comprising:
   deploying a flow deflector that is disposed on a lateral side of the pylon to deflect free-stream airflow between the engine and the wing thereby to influence a shear layer generated between the free-stream flowfield and flow from the engine, the flow deflector being deployed by rotating the flow deflector about an axis extending transversely of the pylon.

17. A method as claimed in claim 16, in which deployment of the flow deflector causes free-stream airflow to be deflected downwards thereby to deflect the shear layer away from the wing.

18. A method as claimed in claim 16, in which deployment of the flow deflector generates turbulence in the free-stream flowfield which promotes mixing of the free-stream airflow and the shear layer thereby to reduce the strength of the shear layer.

19. A method as claimed in claim 16, in which deployment of the flow deflector accelerates flow over the pylon thereby to reduce the strength of the shear layer.

* * * * *